Figure 1:
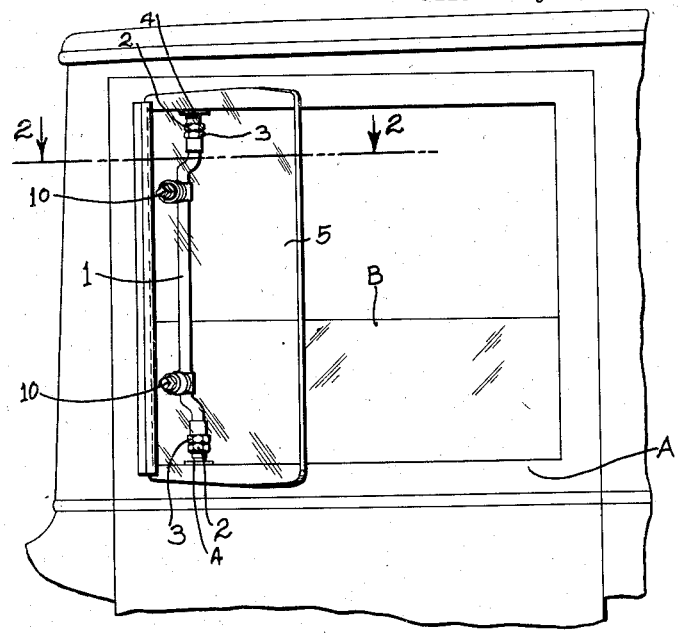

June 14, 1927.

C. A. SAYERS 1,632,564

SIDE WINDSHIELD FOR VEHICLES

Filed July 1, 1926

INVENTOR.
CHARLES A. SAYERS
BY A. B. Bowman
ATTORNEY.

Patented June 14, 1927.

1,632,564

UNITED STATES PATENT OFFICE.

CHARLES A. SAYERS, OF SAN DIEGO, CALIFORNIA.

SIDE WINDSHIELD FOR VEHICLES.

Application filed July 1, 1926. Serial No. 119,812.

My invention relates to side windshields for vehicles, and more particularly adapted for deflecting the side winds of enclosed vehicles such as sedans and the like.

The objects of my invention are; first, to provide side windshields or side wind deflectors which may be easily and quickly applied to the doors and window frames of enclosed vehicles, such as sedans and the like, with a minimum of effort, with the use of only a few tools usually carried in automobiles and without a great deal of fitting; second, to provide a side windshield or deflector which may be secured to the frame of a door, window or other opening of the vehicle without elaborate preparations or without attaching plates or clamp members; third, to provide a side windshield or deflector which may be readily shifted to any desired angular position for deflecting side winds or for directing draft to the interior compartment of the vehicle after the side windshield or deflector is secured in position; fourth, to provide a side windshield or deflector which is so supported on a frame that any desired designs may be provided at the upper and lower ends of the shields; fifth, to provide a shield supporting frame which, by reason of its particular shape, provides resiliency and force against the frame of the door, window or other opening so that the supporting means may be frictionally held in any shifted position relative to the frame until manually shifted to another position; sixth, to provide novel means for piercing the opposite sides of sheet metal or wood frames of doors, windows or other openings in connection with the ends of the shield supporting means, whereby the shield or deflector and the means for supporting the same are located and secured relative to the frame; seventh, to provide a piercing means of this class which also serves as a pivotal mounting for the shield supporting means; eighth, to provide means for piercing the opposite sides of thin sheet metal and wood frames of doors, windows or other openings; ninth, to provide means for piercing the opposite sides of thin sheet metal and wood frames of doors, windows or other openings, said means being adapted to serve as a tapered recess for receiving tapered friction bearings ends of a supporting member; tenth, to provide as a whole a novelly constructed side windshield or deflector, and eleventh, to provide a means of this class which is particularly simple and economical of construction, durable, and which will not readily deteriorate or get out of order.

Figure 2:
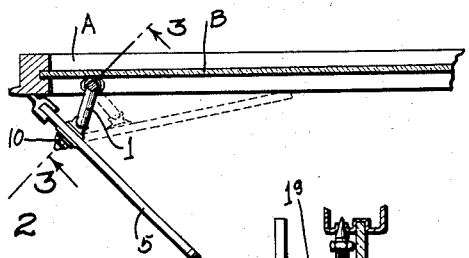
Figure 3:
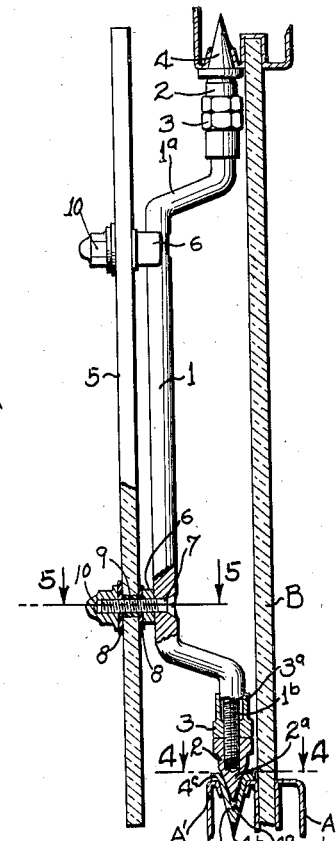
Figures 4, 5, 6:
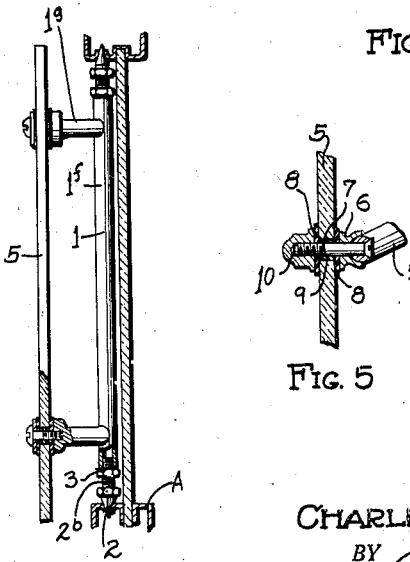

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a fragmentary side elevational view of the forward end of an enclosed automobile, showing my side windshield or deflector mounted thereon; Fig. 2 is a sectional view thereof in plan, taken through 2—2 of Fig. 1; Fig. 3 is an enlarged partial sectional and partial elevational view thereof, taken through 3—3 of Fig. 2; Fig. 4 is a fragmentary sectional view thereof, taken through 4—4 of Fig. 3; Fig. 5 is a sectional view thereof, taken through 5—5 of Fig. 3, and Fig. 6 is a view similar to that shown in Fig. 3 on a reduced scale of a slightly modified form of construction of my side windshield or deflector, certain parts and portions being broken away and in section to facilitate the illustration.

Like characters of reference refer to similar parts and portions throughout the several views of the drawings.

The supporting members 1, pivot members 2, lock nuts 3, piercing and seat members 4, side wind deflector plates 5, plate positioning members 6, screws 7, rubber washers 8, rubber sleeves 9, and the nuts 10, constitute the principal parts and portions of my side windshield or deflector structures in their preferred form of construction.

The frame or supporting members 1 are made of metal bars of any desired cross-section. Said members 1 are offset to one side, as indicated by $1^a$, forming substantially U-shaped members, which may be contracted or compressed slightly at their ends relative to their longitudinal extent, providing longitudinally resilient frames or supporting members. The opposite ends of the members 1 are externally threaded, as indicated by $1^b$. On said threaded ends are screwed the pivot members 2, which are locked relative to the ends of the member 1 by means of lock nuts 3. The ends of the lock nuts 3 opposite the ends engaging the pivot members 2 are counterbored, forming aprons or sleeves 3ª, which extend towards the middle portions of the members 1 and conceal the threaded portions 1ᵇ of the members 1, as shown best in Fig. 3. The outer ends of the pivot members 2 are provided with pivot portions 2ª, which are preferably tapered or conical, as indicated by 2ª, which tapered or conical portions are adapted to extend into recesses 4ª at the outer sides of the middle portions of the piercing and seat members 4. Said recesses 4ª may also be conical, but are preferably of less taper than the tapered or conical portions of the pivot members 2, as shown. Said piercing and seat members 4 are provided at their inner ends with conically shaped or pointed portions 4ᵇ, which are adapted for piercing the opposite sides A¹ of the frames of windows or doors or other openings of enclosed automobiles or other vehicles, said frames being indicated by A in the drawings. The members 4 are provided at their outer sides with plate portions 4ᶜ, which are adapted to rest against the outer sides of the frames A forming the openings in the enclosed automobile or other vehicle, as shown.

Said piercing and seat members 4, however, are employed only when the doors, windows or other frames are made of thin sheet metal or when made of wood covered or trimmed with thin sheet metal or when made of wood. When heavier gage sheet metal is used for making the doors, windows or other frames of the enclosed automobile, the conical points 2ª are used for piercing the sheet metal as well as for pivot bearings in the pierced holes in the sheet metal frames. Thus in the latter use the members 4 are eliminated.

In order to fit the supporting members 1 to the frames of doors and windows or of other openings on the automobile, the same are placed in the desired position, the members 2 screwed outwardly relative to the member 1, either with or without the members 4, depending upon the frame construction, until sufficiently large holes are pierced in the frames of the automobile or other vehicle outside of the glass plates B supported by the frames so as to retain the members 1 in position and to provide sufficient tension by the members 1 and sufficient friction between the members 2 and the pierced seat in the frame or between the members 2 and the members 4. The lock nuts 3 are then screwed against the adjacent ends of the pivot members 2.

It will be here noted that small holes may be drilled in the opposite sides A¹ of the frames A in order to position the piercing portions of the members 2 or 4 and to start the piercing operation of the same when force is applied thereto, thus reducing the bending moment on the offset portion of the supporting member 1. Such drilled holes are necessary when the gage of the door or other frame is particularly heavy, and the holes so drilled are slightly pierced, enlarged or beveled by the pivot members 2 when the same are screwed outwardly in said holes.

At the outer sides and intermediate the ends of the offset portion 1ª of each supporting member 1 are positioned the side windshield spacing and positioning members 6, which extend partially around the members 1 and the axes of which extend preferably at an angle with the offset thereof, as shown best in Fig. 2. The outer sides of said members 6 are flat and position the side windshield or deflector plate 5 at the required or desired angle with the supporting member 1. Said shield or plate 5 is secured to the member 6 and the supporting member 1 by means of screws 7, which extend through the offset portion of the member 1, centrally through the members 6 and through holes in said shield or plate and into nuts 10 at the outer side of said shield or plate. Between the inner side of the nuts 10 and the plate 5, and between the outer sides of the members 6 and the plate 5, are positioned rubber washers 8. Around the screws 7 at the portions extending through the plate 5 are provided rubber sleeves to protect the glass plate 5 from engagement with all metal. The securing of the shield or plate 5 to the supporting member 1, as described, permits the former to be extended above and below the openings in the door, window or other frame of the vehicle, if desired.

At the forward edges of the plates 5 are preferably attached rubber strips 11, which are frictionally secured to said edges of the plates and seal the spaces between the forward edges of the same and the frame of the door, window or other opening.

As shown by dotted lines in Fig. 2, the shield or plate, together with the supporting member, may be shifted to the dotted line position to permit ventilation of the interior compartment of the vehicle.

In the modified form of construction, as shown in Fig. 6, the supporting member 1 is not offset but consists of a straight tubular portion 1ᶠ having outwardly extending arms 1ᵍ corresponding with the members 6 of the preferred structure. In the modified form of construction, the tubular portion 1ᶠ is internally threaded at its opposite ends and the pivot members or piercing and pivot members 2 are provided with externally threaded shanks 2ᵇ, which are adjustably secured in the threaded ends of the tubular portion 1ᶠ. The members 2 are locked in position relative to the ends of the member 1 by means of lock nuts 3, which engage the ends of the portion 1ᵗ. In the modified form of construction shown in Fig. 5, the piercing and seat members 4 are eliminated, and the pierced hole in the frame A forms the seat for the conical piercing portion of the member 2.

Though I have shown and described a particular construction, combination and arrangement of parts and portions and a certain modification thereof, I do not wish to be limited to this particular construction, combination and arrangement nor to the modification, but desire to include in the scope of my invention the construction, combination and arrangement substantially as set forth in the appended claims.

Having thus described my invention, what I claim as new and desire to secure by Letters Patent is:

1. In a means of the class described, the combination with the frame forming a side opening of a vehicle, of a supporting member adapted to be supported at its opposite ends between opposite sides of said frame and provided with a piercing and pivot means at one end for piercing said frame and for providing a pivotal support for said supporting member, and a shield secured to said supporting member adapted to be shifted therewith and deflect wind from the opening formed by said frame.

2. In a means of the class described, a longitudinally yieldable supporting means provided at one end with a piercing and pivot means, and a deflecting shield mounted at one side of said means.

3. In a means of the class described, the combination with a frame forming an opening of a vehicle, of a longitudinally yieldable and resilient supporting means positioned between opposite sides of said frame and provided at its opposite ends with piercing and pivot means, said piercing and pivot means being adapted to pierce opposite sides of said frame and pivotally support said supporting member relative to said frame.

4. In a means of the class described, the combination with a frame forming an opening of a vehicle, of a longitudinally yieldable and resilient supporting means positioned between opposite sides of said frame and provided at its opposite ends with piercing and pivot means, said piercing and pivot means being adapted to pierce opposite sides of said frame and pivotally support said supporting member relative to said frame, and a shield secured to said supporting means and shiftable therewith relative to said frame.

5. In a side wind deflecting structure, a laterally offset and longitudinally resilient supporting member having piercing and pivot means at its opposite ends adapted to pierce holes in a member for positioning the ends of said supporting member.

6. In a means of the class described, the combination with a supporting frame, of a supporting member adapted to be positioned between opposed sides of said frame and provided at its one end with a piercing and pivot means adjustable relative to the main portion of the supporting means for piercing said frame and for pivotally supporting the supporting means thereon.

7. In a side wind deflecting structure, a longitudinally yieldable and resilient supporting means provided at its one end with an adjustable piercing and pivot portion, and a side wind deflecting shield supported by said supporting means.

8. In a side wind deflecting structure, a laterally offset and longitudinally resilient supporting member provided at its end with a longitudinally adjustable piercing and pivot means.

9. In a side wind deflecting structure, the combination with a supporting frame, of a supporting member provided at one end with a pivot portion, a piercing and pivot member positioned at the pivot portion of said supporting member and adapted to pierce a positioning hole in said frame for supporting said supporting member relative thereto, and a deflecting shield supported by said supporting member.

In testimony whereof, I have hereunto set my hand at San Diego, California, this 18th day of June, 1926.

CHARLES A. SAYERS.